Oct. 26, 1954

P. L. J. GERARD 2,692,803

BEARING

Filed July 17, 1952

INVENTOR:-
Paul Louis Julien Gerard
BY Brown & Seward
ATTORNEYS

INVENTOR:—
Paul Louis Julien Gerard
BY Brown & Seward
ATTORNEYS

Oct. 26, 1954     P. L. J. GERARD     2,692,803
BEARING
Filed July 17, 1952     7 Sheets-Sheet 4

INVENTOR:-
Paul Louis Julien Gerard
BY Brown + Seward
ATTORNEYS

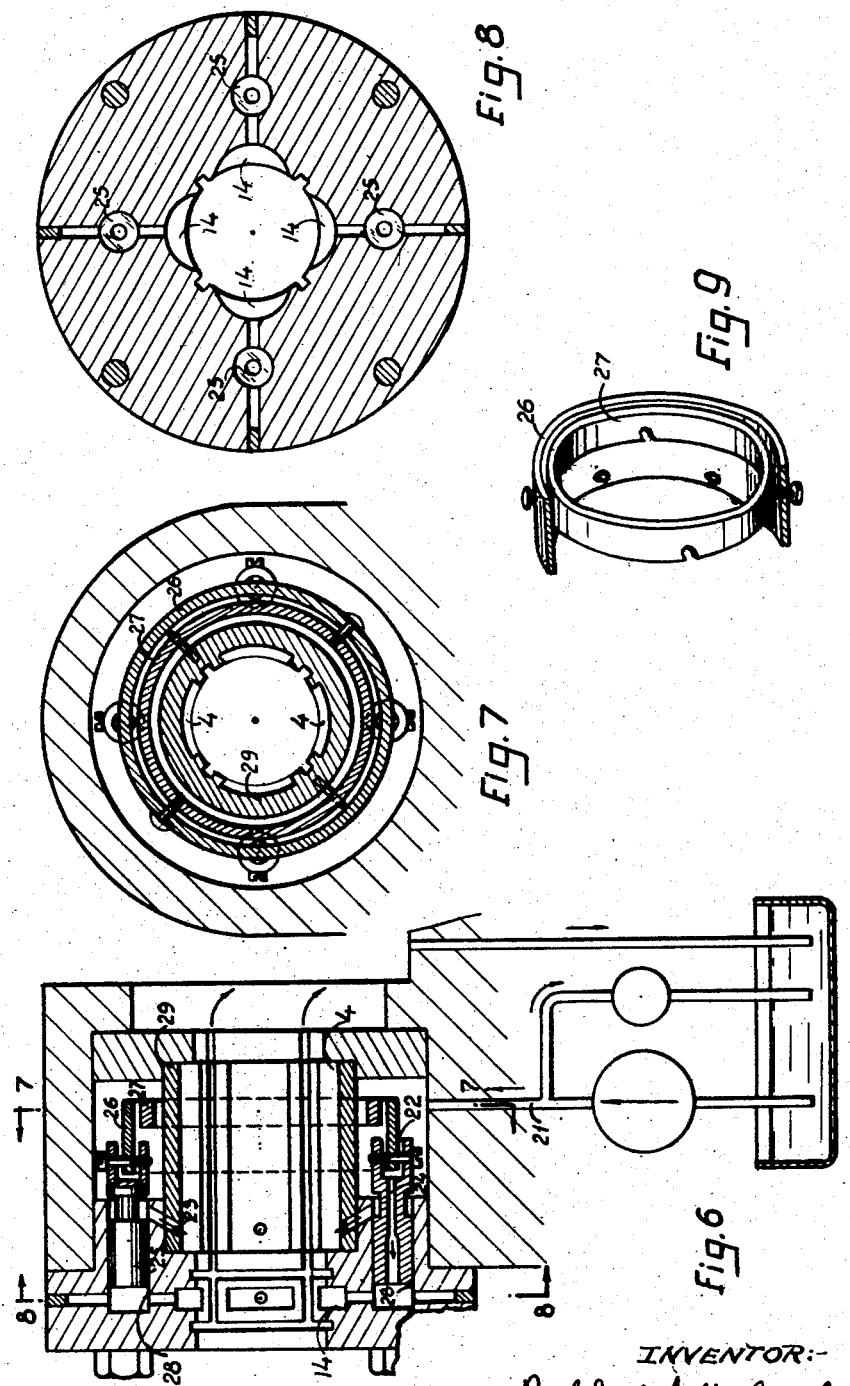

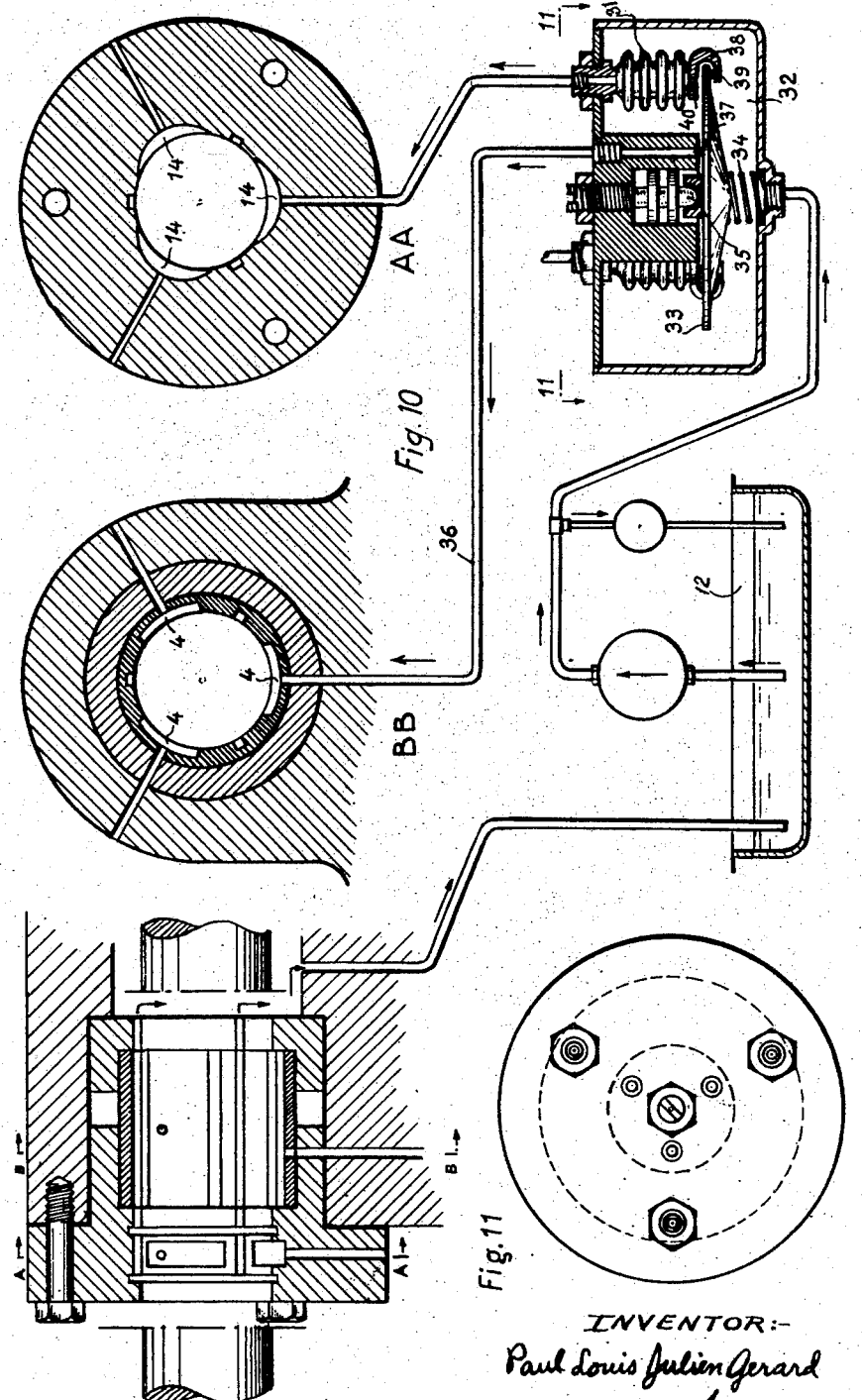

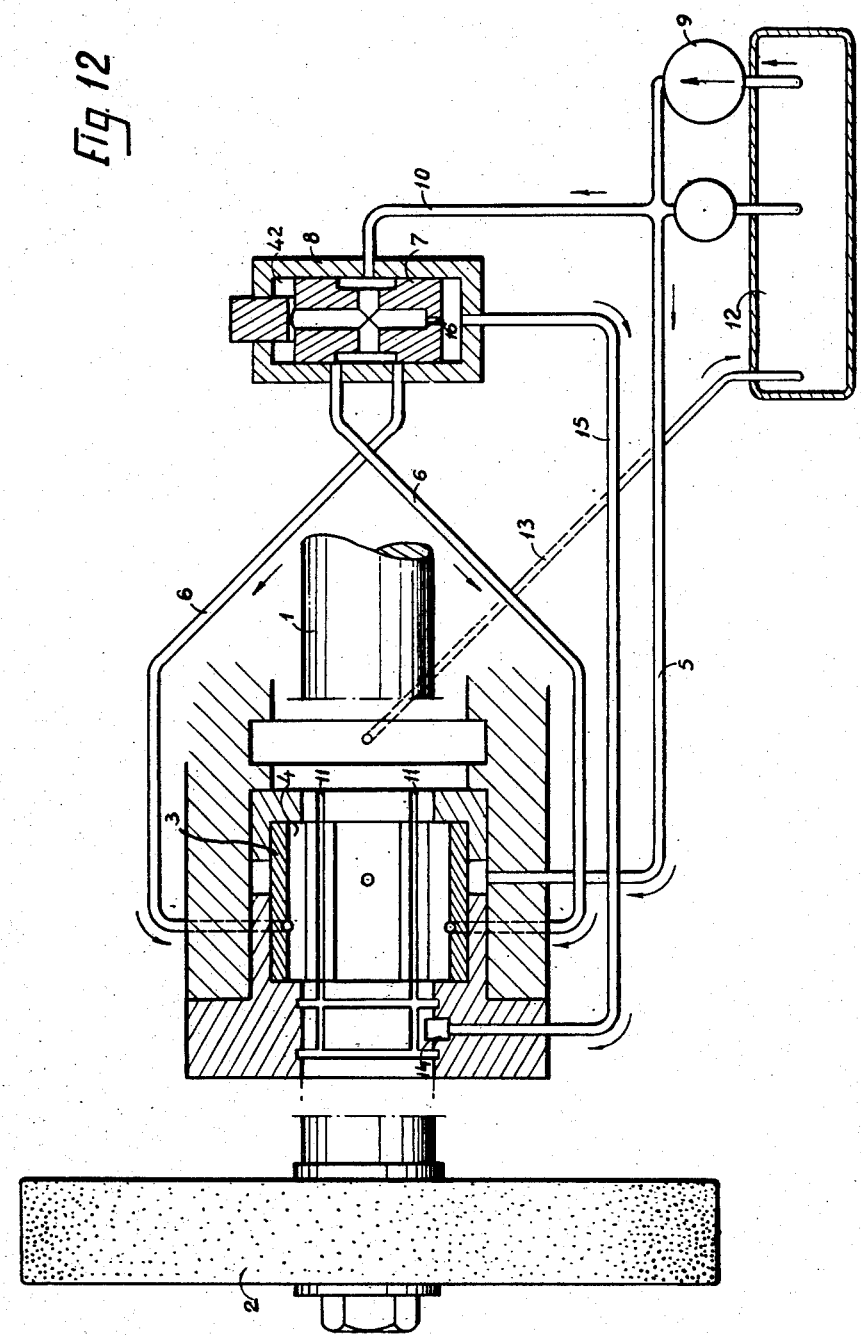

Patented Oct. 26, 1954

2,692,803

UNITED STATES PATENT OFFICE 2,692,803

BEARING

Paul Louis Julien Gérard, Paris, France, assignor to Societe d'Etude et d'Exploitation du Palier Fluide (S. E. E. P. F.), Lyon, Rhone, France, a company of France Application July 17, 1952, Serial No. 299,354

Claims priority, application France July 31, 1951

18 Claims. (Cl. 308—9)

The present invention concerns bearings of the type in which an annular clearance is formed between two concentric members, one of which is adapted to turn in relation to the other and in which means are provided for feeding fluid under pressure to the said clearance so that the two concentric members can never come into contact with one another.

In the known bearings of this type, when the rotative member is displaced with respect to the other member under the action of external loads, the equilibrium of the pressures is modified by reason of the said displacement, which produces an increase in the pressure in the zone in which the two members have moved towards one another, and a corresponding reduction in the pressure in the opposite zone, these new conditions preventing metal-to-metal contact between the two concentric members despite the effect of the said external loads.

Nevertheless, owing to the very fact that the new pressure conditions are determined by the new position occupied by the rotative member in relation to the other member, the two members are no longer completely concentric, which entails disadvantages in some cases.

The present invention has for its object to provide a bearing which is of the aforesaid type, but in which, despite the external loads applied to the rotative member, the latter remains completely concentric to the other member, while the pressure conditions of the fluid are modified as a function of the external loads acting on the rotative member.

According to the invention, the aforesaid bearing is combined with at least one movable member situated in the circuit of the fluid under pressure, but outside the assembly formed by the aforesaid two concentric members, the said movable element being so arranged that, when the external loads are exerted on the rotative member, the movable element in question takes up a position determined by the said loads and thus creates pressure conditions different from those existing in the absence of the aforesaid external loads, so that fresh pressure conditions, corresponding to the new loads, are created without the rotative member having to take up a position different from that which it occupies in the absence of such external loads, the said member being able, notably, to remain completely concentric to the other member.

It must be understood that the invention is applicable to any concentric members, one of which is intended to turn in relation to the other. There will be described in the following, the case of a shaft turning in a fixed bearing, but it will be understood that the same conditions arise in the case of a pivot about which a concentric member surrounding it turns.

It must also be understood that the invention is in no way limited to a self-centering in a plane and that this self-centering may take place either in a single plane, in two perpendicular planes, in three directions at 120° apart and so on.

In the accompanying drawings:

Figs. 1 and 2 are diagrammatic illustrations of the invention under conditions in which self-centering of the piston takes place, and Figs. 3–12 show a number of embodiments of the invention as applied to a bearing in which a rotative shaft is mounted.

In order that the invention may be more readily understood, reference will first be made to Figures 1 and 2, in which the conditions under which the self-centering according to the invention takes place are diagrammatically illustrated.

In Figure 1, there is shown a piston $a$ intended to be constantly maintained in the same position in relation to a cylinder $b$ regardless of the efforts exerted on the said piston in the axial direction, under the effect of pressure conditions created on either side of the said piston with the aid of a movable element $c$, the position of which is varied in accordance with the efforts exerted on the piston $a$, while the latter must not change its position in order to vary the pressure conditions when the efforts exerted thereon change.

The liquid in the illustrated example is situated in a reservoir $d$, a pump $e$ feeding the said liquid under pressure into a distributor body $f$ in which there slides a slide valve $c$ which forms the aforesaid movable element. Ducts $g1$ and $g2$ feed the two ends of the cylinder $b$, in which the piston $a$ is situated. In addition, the ends of the distributor $f$ are connected by ducts $i1$, $i2$ to auxiliary chambers $n1$ and $n2$ formed in the ends of the cylinder $b$ and in which there engage axial extensions $j1$ and $j2$ respectively of the piston $a$, the said extensions being of smaller diameter. The discharge from the said ends towards the reservoir takes place through ducts $k1$ and $k2$ respectively, which communicate through a duct $h$ with the reservoir $d$. The slide valve $c$ has a central annular groove $m$ to which liquid under pressure is constantly fed from the pump $e$, and calibrated constrictions $l1$, $l2$ through which the ducts $i1$, $i2$ are fed. Two other grooves $t1$ and $t2$ are formed in the slide valve on either side of the groove $m$. These two grooves communicate with the discharge ducts $r1$ and $r2$ respectively.

As will be seen from Figure 1, when no asymmetrical force is exerted on the piston $a$ the two main chambers $p1$ and $p2$ are filled with liquid, but do not communicate either with the admission or with the discharge so that the pump does not deliver into the main circuit, while the necessary pressure is maintained in the auxiliary chambers $n1$ and $n2$ through the constricted orifices $l1$ and $l2$ respectively, the fluid flowing from the said chambers through the ducts $k1$ and $k2$. In the position of equilibrium, the cross-sectional areas of throughflow of the ducts $k1$ and $k2$ are equal and consequently the pressures in the auxiliary chambers $n1$ and $n2$ are exactly equal.

When a force is exerted in the direction of the axis on the piston $a$, for example from left to right, the area of throughflow of the duct $k2$ is reduced, while that of the duct $k1$ is increased, so that the pressure in the auxiliary chamber $n1$ formed in the cylinder opposite the extension $i1$ falls and the pressure in the auxiliary chamber $n2$ opposite the extension $j2$ rises.

Owing to the presence of the two constrictions $l1$, $l2$ in the slide valve $c$, the pressure obtaining to the right of the latter becomes greater than that obtaining to the left, so that the slide valve $c$ is moved from right to left. This movement of the slide valve connects the duct $g2$ feeding the main chamber $p2$ with the admission and connects the duct $g1$ feeding the main chamber $p1$ with the discharge. The piston is therefore brought into the central position against the action of the load and the pressure difference between the two sides of the piston tends to maintain it in this position.

To sum up, the variations of the load produce a permanent displacement of the slide valve instead of producing a permanent displacemnt of the shaft, which only undergoes temporary displacements which are automatically cancelled out by movements of the slide valve.

The diagram of Figure 1 corresponds to a bearing in which no discharge groove is situated between the pressure zones, this bearing being of the type in which the pump delivers only when the shaft is subjected to asymmetrical external forces.

The example of Figure 2 is a diagram of the principle of the invention as applied to a fluid bearing of the type described in the patent applications filed in the United States, on the one hand in the name of Mr. Paul Gérard on September 24, 1946, Serial No. 699,051 (abandoned, but see continuation-in-part, Patent No. 2,660,485, Nov. 24, 1953), for "Improvements in Hydraulic Supports" and, on the other hand, in the names of the company entitled Gendron Frières (assignee) and Mr. Paul Gérard on July 8, 1950, Serial No. 172,666, Patent No. 2,660,484, November 24, 1953, for "Improvements in Bearings," in which longitudinal discharge grooves are formed between the pressure zones. In this diagram, the said grooves are represented by discharge ducts $h1$ and $h2$. The ducts $g1$ and $g2$ are always connected to the admission, the pump $e$ constantly feeding into the bearing in order to compensate for the losses through the grooves represented by the ducts $h1$ and $h2$. When the slide valve is in the central position, the ducts $g1$ and $g2$ have an opening section equal to half their total section. Similarly, when the piston $a$ is in the central position, the discharge ducts $h1$ and $h2$ have an opening section equal to half their total section. Any displacement of the slide valve produces an increase in the admission section of one of the ducts and a corresponding reduction of the section of the other. In this example, independently of the control of the pressures in the auxiliary chambers, which act on the slide valve, the piston $a$ itself directly controls the continuous discharge of the fluid under pressure from the pressure zones. In fact, when the piston $a$ moves from left to right, as assumed in the previous case, under the action of the external loads, the said piston $a$ reduces the discharge section of $h2$ and increases the discharge section of $h1$. Consequently, even before the movement of the slide valve has produced a pressure increase in the chamber $p2$ and a corresponding pressure reduction in the chamber $p1$, a pressure increase occurs in the chamber $p2$ and a pressure reduction occurs in the chamber $p1$, whereby the amplitude of the initial displacement of the piston $a$ is reduced. Furthermore, on return of the piston $a$ to its position of equilibrium under the action of the increase in the delivery through $g2$ and of the corresponding reduction in the delivery through $g1$ (resulting from the change of position of the slide valve $c$) the reduction of the discharge section of $h1$ and the increase of that of $h2$ produces a damping effect which prevents the piston $a$ from vibrating substantially.

Figures 3 to 12 show a number of embodiments of the invention as applied to a bearing in which a rotative shaft is mounted.

There is shown in horizontal section in Figure 3 one of the bearings in which there is mounted a shaft supporting a grinding wheel, the said bearing comprising means for self-centering action in a single plane.

Figure 4 shows the same bearing in vertical axial section, as well as in two transverse sections, this illustration being intended to enable the idea of the invention to be more clearly seen.

Figure 5 is a view similar to that of Figure 4 and shows a bearing according to the invention which effects self-centering in one plane, but in the case where the position of the shaft in the bearing is controlled by a templet during operation, as described in the U. S. patent application filed on July 8, 1950, Serial No. 172,667, Patent No. 2,663,977, December 29, 1953, in the names of the company entitled Gendron Frères (assignee) and Mr. Paul Gérard, for "System for Controlling the Position of a Shaft in its Bearings."

Figure 6 is a view in axial section of a bearing according to the invention in which the self-centering is effected in two perpendicular planes.

Figures 7 and 8 are transverse sections along planes extending along the lines 7—7, 8—8 of Figure 6, respectively, and Figure 9 is a partial perspective view of an element of the bearing according to Figure 6.

Figure 10 shows, similarly to Figures 4 and 5, a bearing according to the invention in which the self-centreing is effected in three radial directions 120° apart.

Figure 11 is a plan view of the control element of this assembly, and

Figure 12 shows a simplified constructional form.

Figure 1:
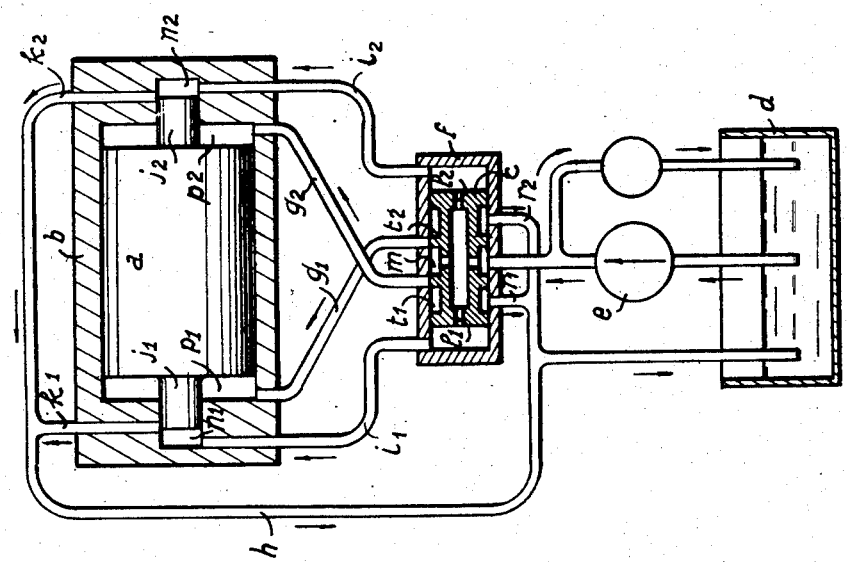
Figure 2:
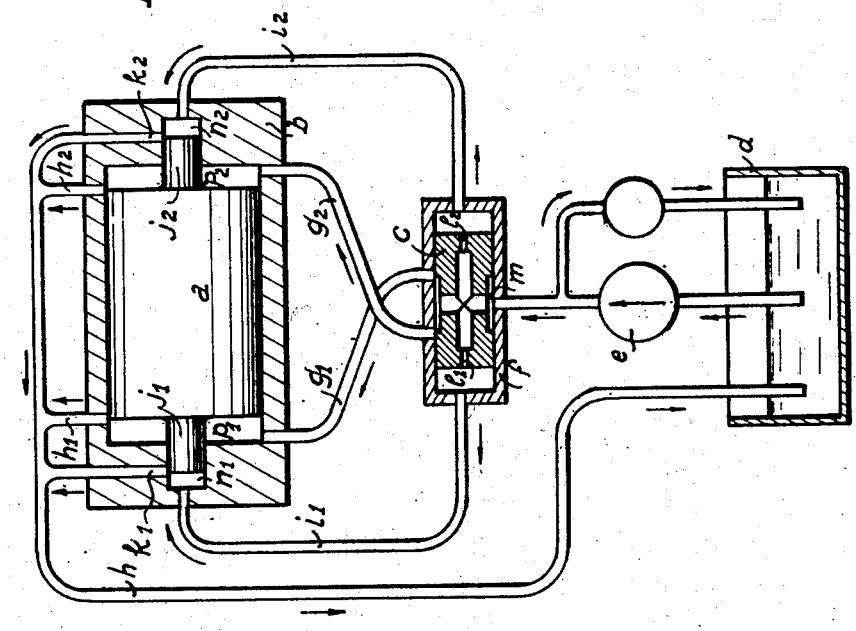
Figure 3:
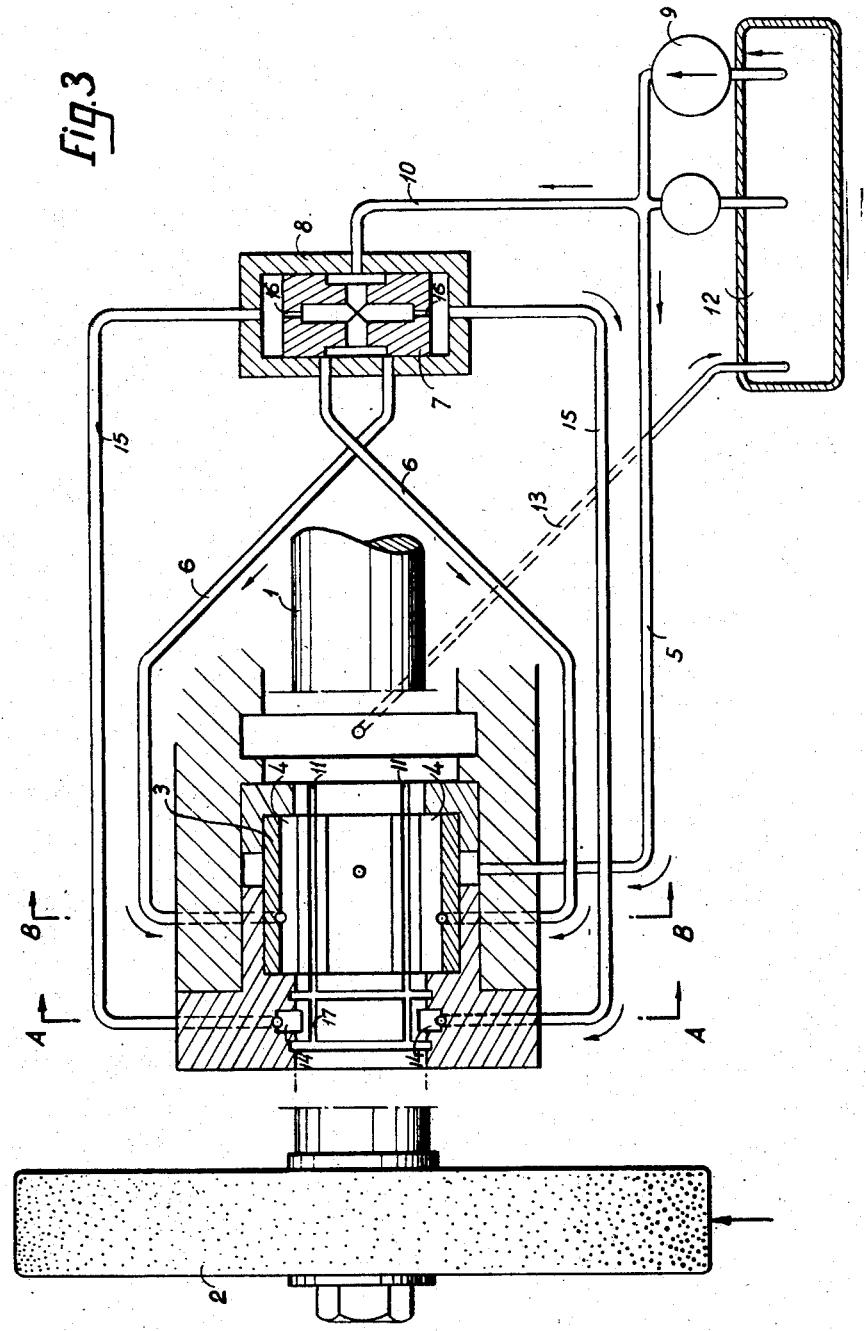
Figure 4:
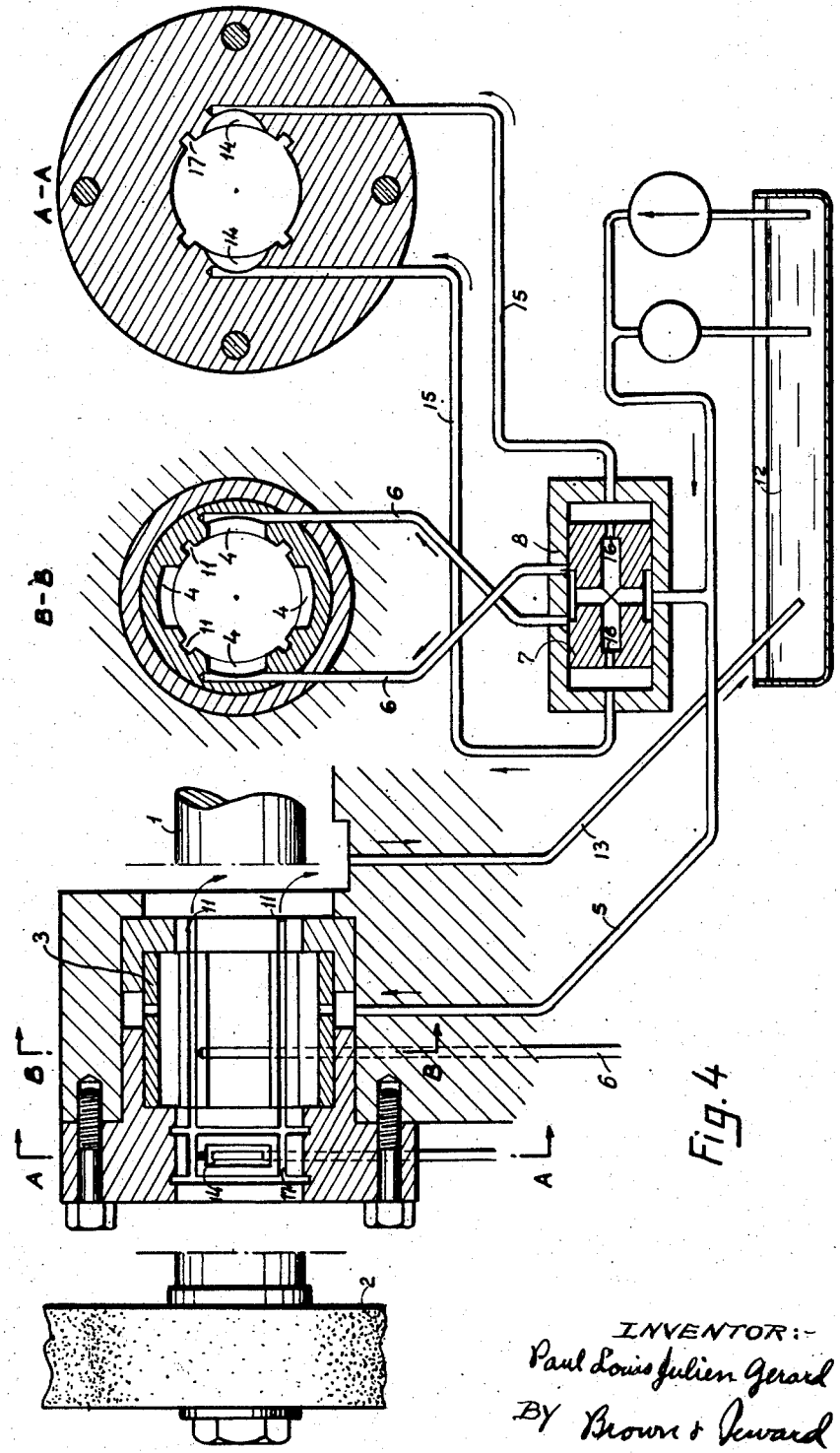

Referring first of all to Figures 3 and 4, there will be seen at 1 a shaft on which a grinding wheel 2 is mounted. There will be seen at 3 one of the bearings of the said shaft, the said bearing being arranged in accordance with the invention. The said bearing comprises four main chambers 4 fed with fluid under pressure. The two chambers which effect the stabilization in the vertical plane are fed through a normal pipe 5, the other two chambers being fed through ducts 6, the opening section of which is controlled by a movable element 7 disposed in the feed circuit and consisting, in the illustrated example, of a slide valve adapted to move axially in a distribution member 8. The said distributor is constantly fed from the pump 9 through a duct 10. In the position of equilibrium, the opening sections of the two ducts 6 are the same owing to the fact that the slide valve is in the central position and exactly covers one half of the section of the said ducts. The fluid under pressure is discharged through longitudinal grooves 11 which communicate with the reservoir 12 through a duct 13. The discharge through the grooves 11, which is controlled in the diagrammatic illustration of Figure 2 by the axial movements of the piston $a$ in relation to the ducts $h1$ and $h2$, is in fact controlled by the radial movements of the shaft. The bearing hereinbefore described, apart from the additional feed through the slide valve, is similar to that described in the aforesaid patent application, metal-to-metal contact between the shaft and the bearing being prevented by continuous circulation of the fluid under pressure through the bearing.

According to the invention, in order to ensure self-centering of the shaft, the bearing 3 is completed by an auxiliary device axially offset in relation to the actual bearing hereinbefore described. It is particularly proposed, as illustrated, to situate the said auxiliary device near the end of the shaft which is likely to be subjected to irregular external forces (in the present case the end on which the grinding wheel is mounted). The said additional device comprises, in the example of Figures 3 and 4, two auxiliary or reference chambers 14 to which fluid under pressure is fed through ducts 15 leading to the ends of the distributor member 8, in which the slide valve 7 is mounted. The ducts 15 are fed with fluid under pressure which enters the distribution member through the duct by way of calibrated constrictions 16. The discharge of the fluid under pressure takes place through longitudinal grooves 17 disposed in alignment with the longitudinal grooves 11 and communicating with the latter. On comparison of the self-centering bearing illustrated in Figures 3 and 4 with the diagram of Figure 2, it will be seen that the slide valve is identical with that illustrated at $c$ in Figure 2, that the ducts 6 feeding the main chamber 4 correspond to the ducts $g1$ and $g2$ feeding the main chambers $p1$ and $p2$, that the longitudinal grooves 11 correspond to the discharge ducts $h1$ and $h2$, the discharge ducts 17 correspond to the discharge ducts $k1$ and $k2$, and finally that the feed ducts 15 of the auxiliary chambers 14 correspond to the ducts $i1$ and $i2$ feeding the auxiliary chambers $n1$ and $n2$. When the grinding wheel 2 is subjected to a force in a horizontal plane, the shaft tends to undergo in this plane a certain movement in relation to the axis of the bearing, which displacement acts immediately in the zone occupied by the auxiliary device and brings about a reduction in the discharge section in the zone in which the shaft is moved towards the inner supporting surface, while on the other hand the pressure is reduced in the opposite zone owing to the increase in the section of the discharge ducts. The pressure in that end of the distributor member 8 which is connected to the chamber in which the said pressure is thus increased therefore becomes greater than the pressure obtaining in the opposite end of the said member and the slide valve 7 is accordingly moved. This movement of the slide valve produces an increase in the feed section of the main chamber 4 situated in the zone towards which the shaft tends to move and a corresponding reduction in the diametrically opposite zone. Thus, the shaft is prevented from moving out of alignment or is immediately returned into the concentric axial position. The pressure conditions corresponding to the new conditions are therefore created solely by the new position occupied by the slide valve without the shaft having to change its position.

Figure 5:
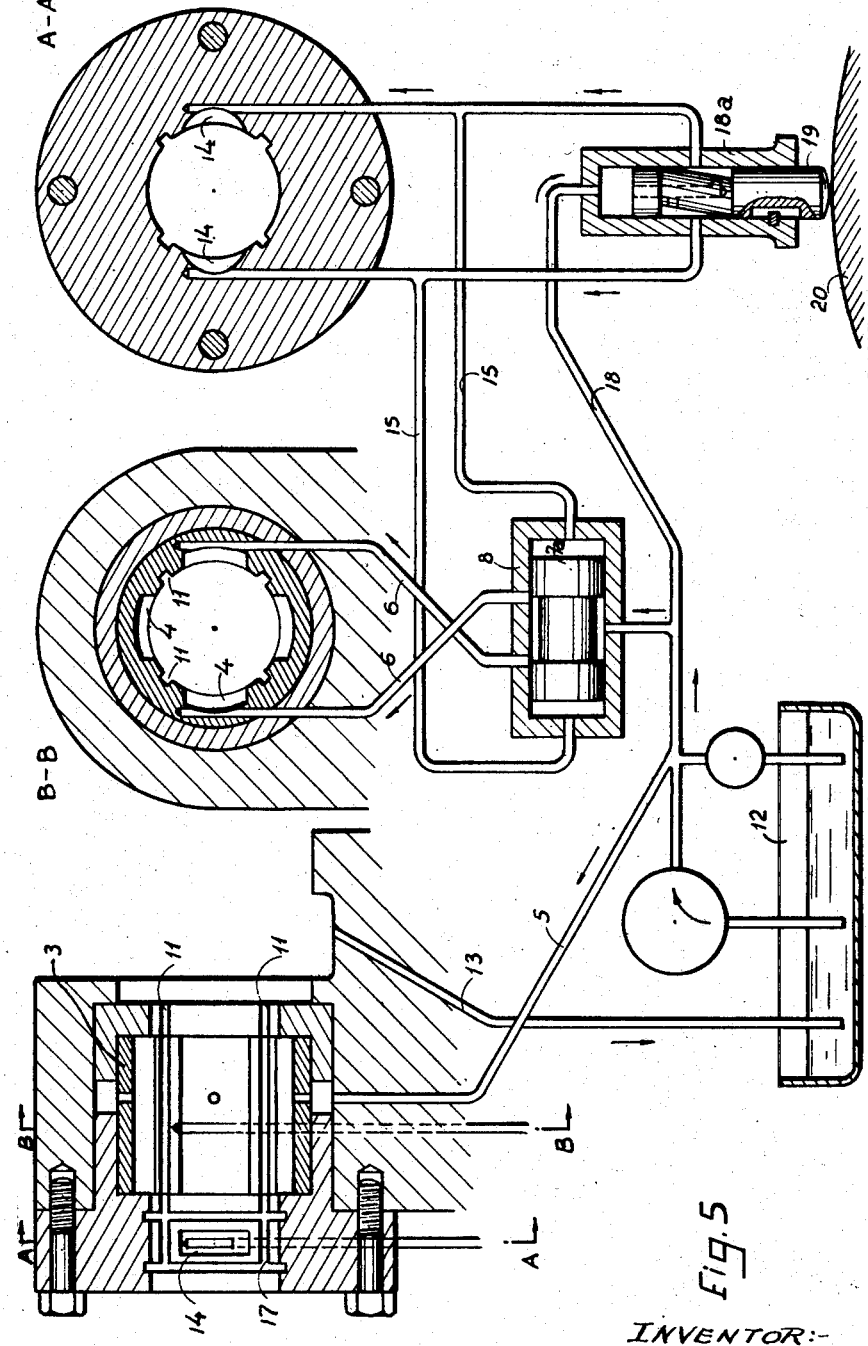

Figure 5 shows in the same manner as Figure 4 a self-centering bearing according to the invention as applied to a grinding machine in which the shaft is intended to take up predetermined positions under the control of a templet in the course of the grinding work. Such a machine has been described in the aforesaid patent application. In this case, the object of the present invention is to prevent the shaft from leaving the eccentric position determined by the templet. The said bearing is similar in its broad outline to that described in Figures 3 and 4, with the difference that the slide valve $7a$ which controls the pressure conditions in the bearing by its position in the member 8, has no constricted passages for feeding the ducts 15 communicating with the auxiliary chambers 14. In fact, the said chambers are fed by a duct 18 through the distributor $18a$, the movable element 19 of which moves along the templet 20. The pressures obtaining in the chambers 14 are simply transmitted through the said ducts 15 to the ends of the member 8 so as to bring the slide valve $7a$ into the position determined by the pressure conditions created in each position of the shaft in the bearings.

In the two examples hereinbefore described, the bearing is self-centering only in the horizontal plane, this case corresponding to grinding by a wheel acting in the said plane.

However, in other applications, it is desirable to effect a self-centering in all directions. In the example illustrated in Figures 6 to 9, this self-centering in all directions is effected in two perpendicular planes. In this example, the main chambers 4 and the auxiliary chambers 14 are fed from ducts 21 through a chamber 22, this chamber communicating through ducts 23 with the main chambers 4 and through constricted ducts 24 with the auxiliary chambers 14. The control of the feed of the main chambers by the pressure conditions obtaining in the auxiliary chambers requires, for each of the planes in which the self-centering is to be effected, at least one external movable element acting in the manner of the slide valve $c$ of Figure 2. In the illustrated example, the control in each of the said planes is effected by two pistons 25 mounted on a ring concentric with the bearing at two diametrically opposite points of the said ring, so that any movement of one of the said pistons is accompanied by a movement in the opposite direction and of equal amplitude of the other piston, whereby a reduction in the section of one of the passages 23 and an increase in the section of the diametrically opposite passage 23 are simultaneously produced in the same degree. The two rings, on each of which two pistons 25 are mounted as hereinbefore described, are in turn mounted on a universal joint on the bearing 29, the diameters on which the two pairs of pistons are mounted being perpendicular to one another. Each of the pistons 25 slides in a cylindrical bore 28, the pressure in said bore thus acting on the front face of the said piston. The chambers 14 themselves are spaced at 90° around the periphery of the bearing and their relative positions correspond to those of the main chambers 4.

In this example, it will be seen that the movable element c of Figure 2 may be replaced by a plurality of movable elements (four in the illustrated example) which are suitably associated and may be incorporated in the structure of the bearing, whereby a construction in the form of a single unit can be obtained.

The operation of the bearing described in this example is the same as before, except that each assembly of two auxiliary chambers 14 diametrically opposite one another acts in one of the two orthogonal planes, the combination of the actions in these two planes permitting of automatically compensating for the external forces exerted on the shaft in any direction whatever.

In the example illustrated in Figures 10 and 11, the number of movable elements which control the pressure conditions in the bearing is 3, these movable elements not consisting of slide valves in this example, but of an assembly of three diaphragms and a circular plate, the position of which controls the feed of the main chambers of the bearing. The said plate normally occupies a symmetrical position in relation to the apertures through which the fluid under pressure is introduced into the chambers of the main bearing, but takes up an inclined position when the pressure conditions in the auxiliary chambers change.

This pressure acts on the plate through diaphragms 31 in which the respective pressures of the said auxiliary chambers obtain. In the example illustrated in Figures 10 and 11, the automatic balancing is effected in three planes 120° apart. The main bearing also comprises three main chambers 4, 120° apart, and the auxiliary device comprises three corresponding chambers 14. The chambers 14 each communicate with one of the diaphragms 31. The fluid under pressure is fed into the pump in a casing 32 in which there is disposed a plate 33 urged by a spring 34 against a pivot 35. The pipes 36 feed the main chambers 4 of the bearing communicating with passages 37 disposed perpendicularly to the plate when the latter occupies its normal position in the absence of asymmetrical pressures, the said plate being adapted to throttle to a varying degree one or two of the passages while further freeing the others, or the other, when it takes up an inclined position. The said plate is in turn controlled by the diaphragms 31, which comprise hooks 38 provided with points 39 which bear against the lower face of the plate. The auxiliary chambers 14 are fed through the diaphragms 31, in which a constricted passage 40 is provided for this purpose.

Figure 12 shows a simplified constructional form in which only one auxiliary chamber 14 is provided, the pressure which obtains in this chamber acting on a slide valve 7, the other face of which is subjected to an antagonistic pressure provided by the feed pump, but acting on a smaller surface. Owing to the fact that the pump feeds, on the one hand, directly, the chamber 42 in which this antagonistic pressure acts, and on the other hand, through a constriction, the auxiliary chamber, the slide valve is only in equilibrium when the discharge section of the auxiliary chamber bears a predetermined ratio to the section of the aforesaid constriction.

What is claimed is:

1. A bearing structure comprising two substantially concentric interfitting members with a clearance therebetween, one member being stationary and the other rotatable, a plurality of pressure zones equally spaced around the periphery of said stationary member, means to feed fluid under pressure to said pressure zones, at least two reference chambers formed in the periphery of said stationary member, outside said pressure zones, means to feed fluid under pressure to said reference chambers and a distributor connected to said reference chambers, having movable control means responsive to the pressure in said reference chambers, and controlling the feed circuit of said pressure zones, whereby any unbalance between the pressures in said reference chambers due to load variations determines a change in the position of said movable control means until a new position of equilibrium determined by the new position of said movable control means is reached, without change of the relative position of the axes of said stationary and rotatable members.

2. A bearing structure comprising two substantially concentric interfitting members with a clearance therebetween, one member being stationary and the other rotatable, a plurality of pressure zones equally spaced around the periphery of said stationary member, means to feed said pressure zones with fluid under pressure, longitudinal discharge grooves formed between said zones, at least two reference chambers formed in the periphery of said stationary members, outside said pressure zones, means to feed fluid under pressure to said reference chambers and a distributor connected to said reference chambers, having movable control means responsive to the pressure in said reference chambers, and controlling the feed circuit of said pressure zones, whereby any unbalance between the pressures in said reference chambers due to load variations determines a change in the position of said movable control means until a new position of equilibrium determined by the new position of said movable control means is reached, without change of the relative position of the axes of said stationary and rotatable members, while said rotatable member furthermore directly controls the continuous discharge of the fluid under pressure through said longitudinal grooves thereby reducing its initial displacement and creating a damping effect opposing vibrations.

3. A bearing structure according to claim 1 in which said rotatable member is constituted by a shaft and said stationary member by at least one bearing.

4. A bearing structure according to claim 2 in which said rotatable member is constituted by a shaft and said stationary member by at least one bearing.

5. A bearing structure according to claim 2, in which the rotatable member is constituted by a shaft on which a grinding wheel is mounted, said stationary member being constituted by at least one bearing, means being provided for controlling the position of the axis of said shaft from a templet.

6. A bearing structure according to claim 1, in which two diametrically opposed reference chambers are provided and in which said distributor control means comprises a sliding movable member.

7. A bearing structure according to claim 2, in which two diametrically opposed reference chambers are provided and in which said distributor control means comprises a sliding movable member.

8. A bearing structure according to claim 1, in which four reference chambers are provided 90° apart around the axis of said stationary member, whereby automatic control of the position of said rotatable member is effected in two orthogonal planes.

9. A bearing structure according to claim 8, in which the distributor control means comprises a movable member for each reference chamber in the form of a piston sliding in a cylindrical bore communicating directly with said reference chamber, means being provided to mechanically connect diametrically opposed pistons of each pair, so that any movement of one of said pistons is accompanied by a movement in opposite direction and of same amplitude of the other, each pair of pistons thus performing the same function as a single slide valve, controlled by the pressures in two diametrically opposed reference chambers.

10. A bearing structure according to claim 2, in which four reference chambers are provided 90° apart around the axis of said stationary member, whereby automatic control of the position of said rotatable member is effected in two orthogonal planes.

11. A bearing structure according to claim 10, in which the distributor control means comprises a movable member for each reference chamber in the form of a piston sliding in a cylindrical bore communicating directly with said reference chamber, means being provided to mechanically connect diametrically opposed pistons of each pair, so that any movement of one of said pistons is accompanied by a movement in opposite direction and of same amplitude of the other, each pair of pistons thus performing the same function as a single slide valve, controlled by the pressures in two diametrically opposed reference chambers.

12. A bearing structure according to claim 1, in which automatic control of the rotatable member position is effected in $n$ radial directions, $n$ being a whole number equal at least to 3, and in which there are provided $n$ reference chambers spaced $360°/n$ apart around the periphery of said stationary member.

13. A bearing structure according to claim 12, in which the distributor control means comprises a swivellably mounted circular plate and an assembly of $n$ diaphragms, through which the pressure in the $n$ reference chambers acts on said plate, the position of which controls the feed of said pressure zones.

14. A bearing structure according to claim 2, in which automatic control of the rotatable member position is effected in $n$ radial directions, $n$ being a whole number equal at least to 3, and in which there are provided $n$ reference chambers spaced $360°/n$ apart around the periphery of said stationary member.

15. A bearing structure according to claim 14, in which the distributor control means comprises a swivellably mounted circular plate and an assembly of $n$ diaphragms, through which the pressure in the $n$ reference chambers acts on said plate, the position of which controls the feed of said pressure zones.

16. A bearing structure comprising two substantially concentric interfitting members with a clearance therebetween, one member being stationary and the other rotatable, a plurality of pressure zones equally spaced around the periphery of said stationary member, means including a pump to feed fluid under pressure to said pressure zones, a reference chamber formed in the periphery of said stationary member outside said pressure zones, means to feed fluid under pressure to said reference chamber and a distributor connected to said reference chamber, said distributor having a movable member submitted to the presure in said reference chamber at one side and to a predetermined constant pressure on the other side, said distributor controlling the feed circuit in said pressure zones, whereby any unbalance creating pressure variations in said reference chamber due to load variations determines a displacement of said movable member until a new position of equilibrium determined by the new position of said movable member is reached, without change of the relative position of the axes of said stationary and rotatable members.

17. A bearing structure according to claim 16, in which said movable member of said distributor is constituted by a slide valve, one face of which is submitted to the pressure of said reference chamber and the other, of a smaller cross-section, to the counteracting constant pressure fed by the pump feeding said pressure zones, said feed pressure being furthermore fed through a restricted passage to the face of said slide valve submitted to the pressure in said reference chamber.

18. A bearing structure comprising two substantially concentric interfitting members with a clearance therebetween, one member being stationary and the other rotatable, a plurality of pressure zones equally spaced around the periphery of said stationary member, means to feed said pressure zones with fluid under pressure, longitudinal discharge grooves formed between said zones, a reference chamber formed in the periphery of said stationary member outside said pressure zones, means to feed fluid under pressure to said reference chamber and a distributor connected to said reference chamber, said distributor having a movable member submitted to the pressure in said reference chamber at one side and to a predetermined constant pressure on the other side, said distributor controlling the feed circuit in said pressure zones, whereby any unbalance creating pressure variation in said reference chambers due to load variations determines a displacement of said movable member until a new position of equilibrium determined by the new position of said movable member is reached, without change of the relative position of the axes of said stationary and rotatable members, while said rotatable member furthermore directly controls the continuous discharge of the fluid under pressure through said longitudinal grooves thereby reducing its initial displacement and creating a damping effect opposing vibrations.

References Cited in the file of this patent

UNITED STATES PATENTS

| Number | Name | Date |
| --- | --- | --- |
| 2,062,250 | Moller | Nov. 24, 1936 |
| 2,354,296 | Arms | July 25, 1944 |
| 2,459,826 | Martellotti | Jan. 25, 1949 |